Jan. 1, 1963   V. ASARO ET AL   3,071,367
SEAT CONSTRUCTION
Filed Aug. 27, 1958   3 Sheets-Sheet 1
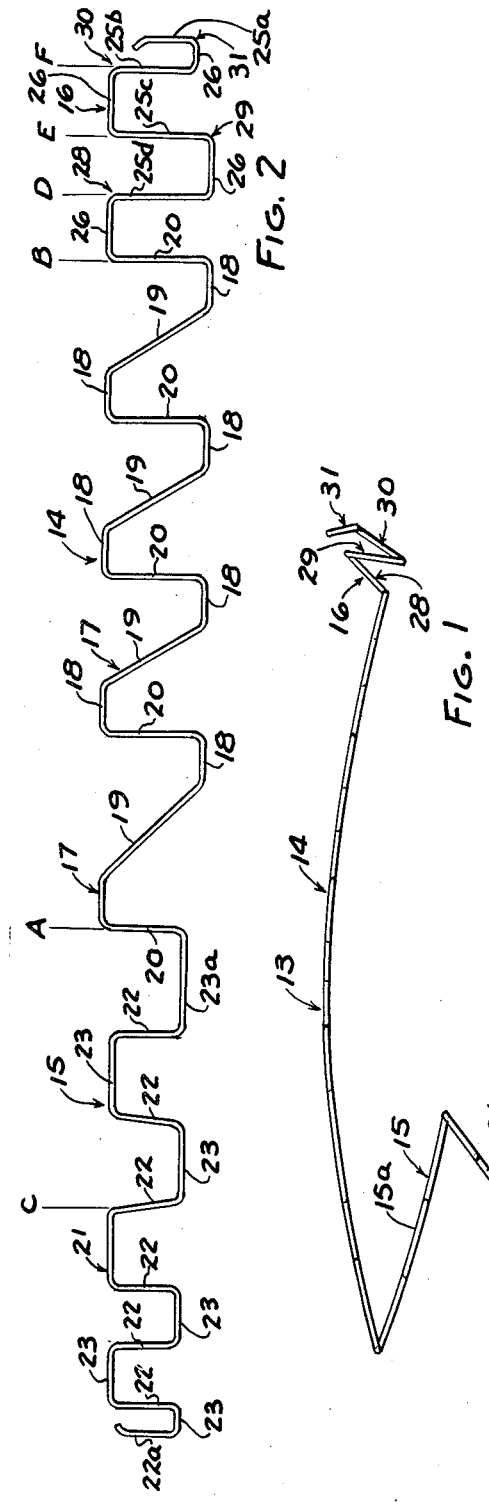
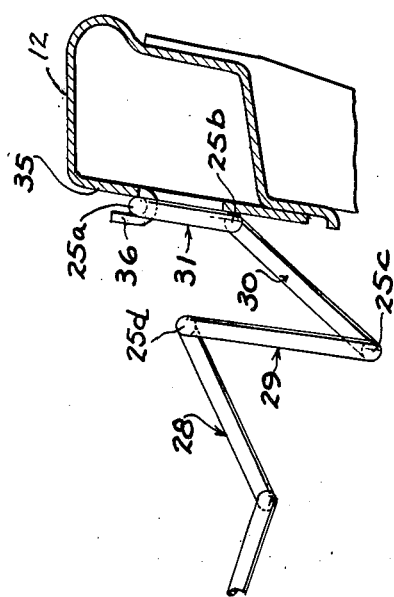
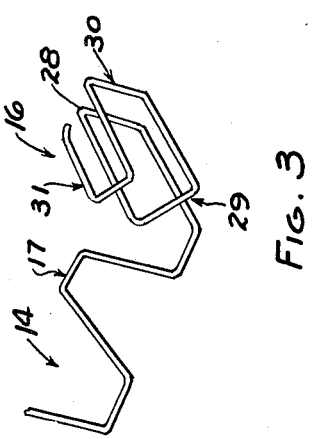
INVENTORS
VITO ASARO &
HENRY J. TISCHLER
BY
Barnes, Kisselle, Raisch & Choate
ATTORNEYS Jan. 1, 1963 V. ASARO ET AL 3,071,367
SEAT CONSTRUCTION
Filed Aug. 27, 1958 3 Sheets-Sheet 2

INVENTORS
VITO ASARO &
HENRY J. TISCHLER
BY
ATTORNEYS

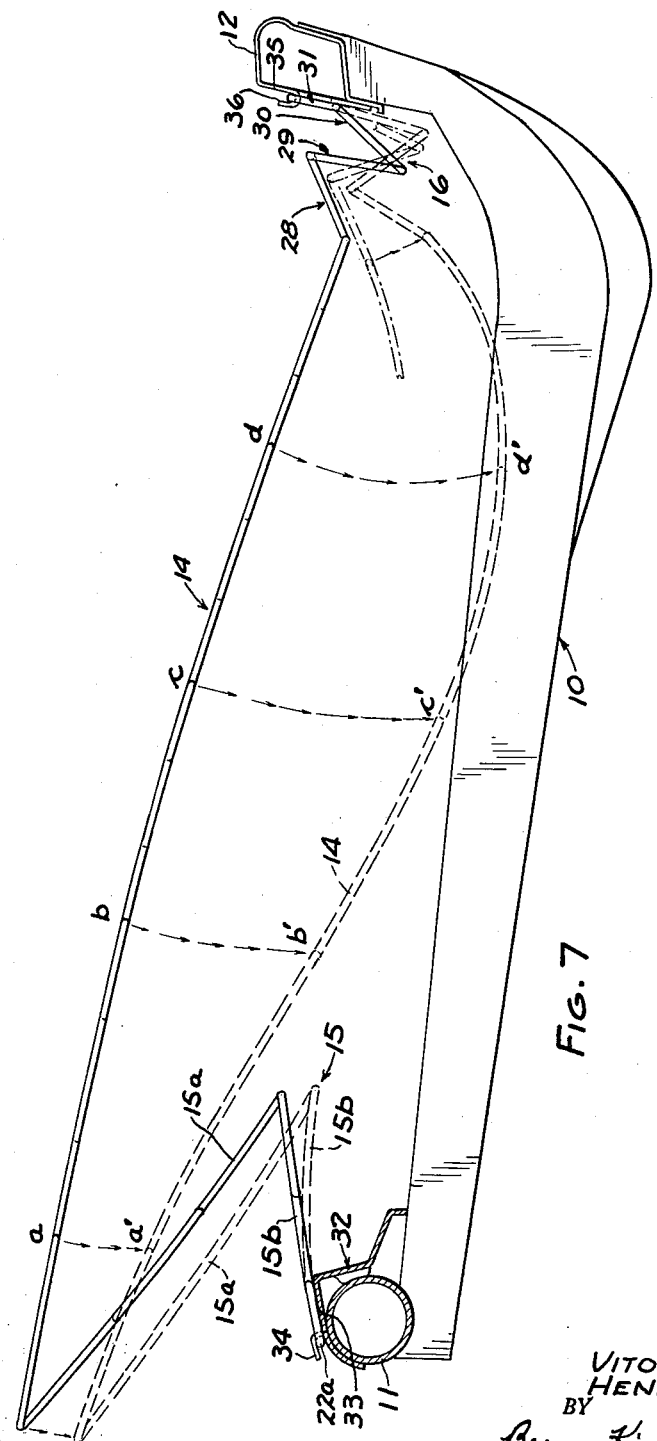

3,071,367
SEAT CONSTRUCTION
Vito Asaro, East Detroit, and Henry J. Tischler, Huntington Woods, Mich., assignors to Young Spring & Wire Corporation, Madison Heights, Mich., a corporation of Michigan
Filed Aug. 27, 1958, Ser. No. 757,534
12 Claims. (Cl. 267—107)

This invention relates to a seat construction and more particularly to a seat cushion employing wire springs of the zigzag or sinuous type.

Seat cushions of the above described type usually include a plurality of transversely spaced sinuous main springs connected at their ends to the front and rear rails of the seat frame. The front ends of such sinuous main springs usually comprise a V-shaped supporting portion. In instances where the rear rail of the seat frame is elevated a corresponding V-shaped supporting portion cannot be used at the rear of the spring and it is necessary to provide auxiliary or helper springs for reinforcing the main springs. The use of auxiliary or helper springs represents a substantial portion of the cost of the seat cushion and results in a seat cushion which is relatively thick.

It is an object of this invention to provide a seat cushion which does not require auxiliary or helper springs. The seat cushion may thus be manufactured more economically. In addition, the thickness of the seat cushion is reduced to a minimum. The reduction in the thickness is desirable because of the present trend in automobile construction toward lowering the roof thereby tending to reduce the permissible headroom.

In the drawings:

FIG. 1 is a side elevational view of a spring embodying the present invention.

FIG. 2 is a plan view of the spring after the wire has been corrugated but prior to bending of the spring to the shape illustrated in FIG. 1.

FIG. 3 is a fragmentary perspective view on an enlarged scale of the rear portion of the spring shown in FIG. 1.

FIG. 4 is a fragmentary side elevational view on an enlarged scale partly in section showing the rear portion of the spring mounted on the seat frame.

FIG. 7 is a sectional view similar to FIG. 6 on an enlarged scale and showing the contour of the spring both when severely loaded and when unloaded.

Figure 5:
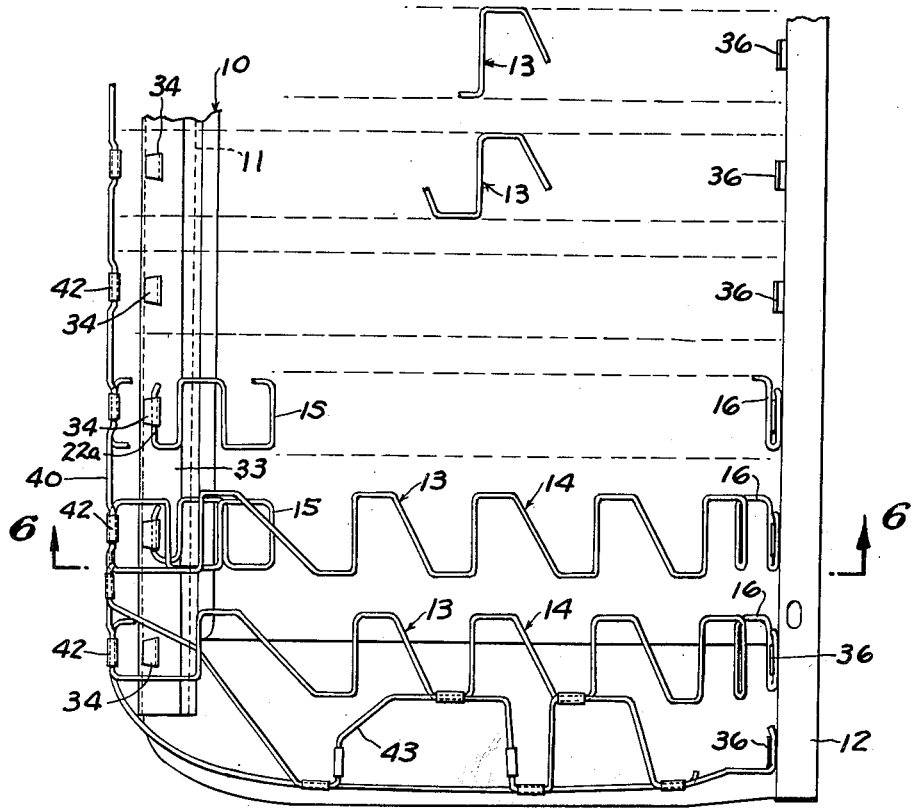
FIG. 5 is a fragmentary plan view of a seat cushion unit embodying the invention.
Figure 6:
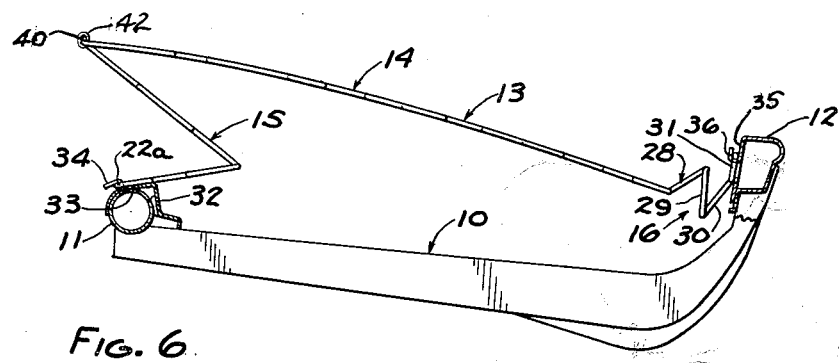
FIG. 6 is a sectional view taken along the line 6—6 of FIG. 5.

Referring first to FIGS. 5 and 6, a seat cushion unit embodying the invention includes a seat frame 10 having a front tubular rail 11 and a rear tubular rail 12. The supporting surface of the seat cushion unit is formed primarily by a plurality of transversely spaced, identically shaped springs 13 which have their front ends secured to the rail 11 and their rear ends secured to the rail 12.

As is shown in FIGS. 1 and 6, spring 13 includes a central load bearing portion 14, a front supporting portion 15, and a rear supporting portion 16. Spring 13 is initially formed as a flat element of corrugated or zigzag shape as illustrated in FIG. 2. Thereafter the spring is bent at a plurality of selected points to impart to the spring the contour illustrated in FIG. 1. In relation to the showing in FIG. 2, the central load bearing portion 14 of the spring comprises that portion between the points A and B. The front supporting portion 15 is formed from the portion of the spring lying to the left of the point A and the rear supporting portion 16 is formed from the portion lying to the right of point B in FIG. 2. Each of these three portions of the spring comprises a plurality of corrugations or loops, the adjacent loops being reversely positioned and connected by a common leg.

The loops of the central load supporting portion 14 are designated 17, each including a pair of cross bars 19, 20 connected by straight longitudinally extending bars 18. The cross bars 20 are perpendicular to the longitudinally extending bars 18 and the cross bars 19 are angularly inclined to the longitudinally extending bars 18. The cross bars 20 are parallel to one another and the cross bars 19 are generally parallel to one another.

The portion of the spring from which the front supporting portion 15 is formed comprises a plurality of loops designated 21 each including a pair of cross bars 22 connected by longitudinally extending bars 23. The cross bars 22 are generally perpendicular to the longitudinally extending bars 23. The cross bar 22a at the front end of the spring is formed into a hook, as illustrated, for securing the front end of the spring to the rail 11.

The portion of the spring from which the rear supporting portion 16 is formed comprises four loops designated 28, 29, 30 and 31. These loops are formed by cross bars 25 connected by longitudinally extending bars 26. In the case of the loop 28 next adjacent the portion 14, the cross bars are designated 20 and 25, the cross bar 20 being in common with the adjacent loop 18 of the portion 14. The end cross bar 25a is fashioned as a hook, as illustrated, for securing the rear end of the spring to the rail 12.

It will be noted that the cross bar 20 adjacent the loops 21 is shorter than the remaining cross bars 20 and that the cross bars 25a and 25b of the end loop 31 are shorter than the other two cross bars 25. Likewise the longitudinally extending bar 23a next adjacent loops 17 is longer than the remaining longitudinally extending bars 23 of the loops 21. The radii at the connections between the cross bars and the longitudinally extending bars are preferably two to five times the diameter of the wire used to form the spring.

In forming the spring illustrated in FIG. 2 to the contour illustrated in FIG. 1, it is bent at the points designated C, A, B, D, E and F. The front supporting portion 15 is formed by twisting the cross bar 20 at line A and the cross bar 22 at line C so as to provide two spring legs 15a and 15b which define the commonly known fishmouth at the front end of the spring. The rear supporting portion 16 of the spring is formed to the contour illustrated in FIG. 1 by twisting the bar 20 at the line B, the next two bars 25 at the lines D and E and the bar 25b at the line F so that the rear supporting portion 16 as a whole extends generally upwardly and rearwardly to the central load bearing portion 14. The spring is twisted about these bars so that the first loop next adjacent the load bearing portion 14, designated 28, extends upwardly and rearwardly, the next loop designated 29 extends downwardly and slightly forwardly, the third loop designated 30 extends upwardly and rearwardly at a slightly greater angle to the horizontal than the first loop 28, and the fourth loop designated 31 extends upwardly and forwardly.

Referring to FIGS. 6 and 7, a metal support 32 is secured over the front rail 11 of the seat frame. Support 32 has substantially flat surface 33 which is inclined slightly upwardly and rearwardly. Along the forward edge of surface 33 tabs 34 are struck up at longitudinally spaced points from the support 32 and bent forwardly to serve as a means for fastening the front ends of springs 13 to frame 10. Bar 22a at the forward end of each spring 13 is hooked under a tab 34 and the end loop on the forward end of the front supporting portion 15 rests flatly on surface 33. By this arrangement, the end loop on the front end of each spring 13 is prevented from pivoting downwardly or in a clockwise direction as viewed in FIGS. 6 and 7 when the seat cushion is loaded.

Referring to FIGS. 4, 6 and 7, rear rail 12 is formed with a substantially flat and generally vertical surface 35 from which longitudinally spaced tabs 36 are struck and bent upwardly. Bar 25a at the rear end of each spring element 13 is hooked behind a tab 36 so that end loop 31 rests flatly against the surface 35. By this arrangement, end loop 31 on the rear end of each spring 13 is prevented from pivoting downwardly or in a counterclockwise direction as viewed in FIGS. 4, 6 and 7 when the seat cushion is loaded.

A comparison of FIG. 1 with FIGS. 4 and 7 shows that when each spring 13 is anchored to the rails as described, it is stressed such that rear end loop 31 extends upwardly and slightly rearwardly rather than upwardly and forwardly as is the case when the spring is in the unmounted and untensioned condition shown in FIG. 1. This tensioning preloads the central load supporting portion 14.

As shown in FIGS. 5 and 6, a border wire 40 may be provided at the forward end of the load supporting portion 14, being connected thereto by clips 42. The border wire 40 extends along the front and sides of the seat and the ends thereof are fastened to rear rail 12 by hooking behind a struck-out tab 36. The two endmost springs 13 at opposite ends of the seat are interconnected with the side runs of border wire 40 by sinuous springs 43 as illustrated. No additional auxiliary springs or reinforcing elements are provided or needed in the seat cushion unit.

The action of each spring 13 under load is shown in FIG. 7. The position shown in full lines represents the relative position of the various portions of the spring 13 prior to loading. When a load is applied to the cushion unit, such as by a person being seated thereon, spring element 13 deflects and load bearing portion 14 of element 13 moves downwardly until the rear end thereof assumes an upwardly concave shape while the forward end thereof assumes a slightly upwardly convex shape. The load bearing portion 14 as a whole assumes a generally upwardly concave shape. The legs 15a and 15b of front supporting portion 15 deflect into less divergent relationship as shown by the dotted lines.

The loops of rear supporting portion 16 progressively change in their relationship in response to loading of the cushion unit as shown by the dotted lines in FIG. 7. The dotted line showing represents a severe loading of the seat cushion unit. End loop 31 remains in the same position because of its abutting relationship to surface 35. Transverse bar 25b between loops 30 and 31 twists about its axis so that loop 30 pivots counterclockwise about the axis of bar 25b. Transverse bar 25c between loops 29 and 30 twists about its axis so that loop 29 pivots in an opposite direction to loop 30 about the axis of bar 25c, the angle between the planes of loops 30 and 29 progressively increasing as the load increases. Loop 28 pivots in an opposite direction to loop 29 about the upper end of loop 29 by a twisting or torsion action of the transverse bar 25d between loops 28, 29, the angle between the planes of loops 28, 29 increasing progressively as the load increases. The angle between the rearmost loop 17 on the load bearing portion 14 and loop 28 increases progressively as the load increases.

As shown in FIG. 7, all points on the load supporting portion 14 move substantially vertically in response to loading of spring 13. This is illustrated by the locations of the points a, b, c and d on the unloaded spring relative to the same points a', b', c' and d' when the spring is loaded.

A seat cushion unit incorporating the springs described provides the required support without bottoming under the weight of a heavy person. At the same time the seat feels soft and resilient. In addition to providing the required support and resiliency, the seat has a minimum vertical height so that it is admirably suited for use in automobiles having a minimum headroom. Since no auxiliary springs or reinforcing elements are needed and since the sinuous loops comprise straight bars, a minimum amount of wire is used resulting in substantial savings in cost.

The above advantages of our seat construction result primarily from the design of the rear supporting portion 15 of spring 13. The use of the four spring loops as described and the preloading of the spring when it is anchored to the seat frame provide the comfortable, yielding support without the use of auxiliary or helper springs. With respect to the specific design of the rear supporting portion 15, we have found that the transverse bars 25 should be substantially parallel and straight and the longitudinal bars 26 should preferably be straight.

We claim:

1. In a seat cushion, the combination of a seat frame having a front portion and a rear portion, a plurality of sinuous springs connected at their front ends to the front portion of said frame and at their rear ends to the rear portion of said frame, said springs being of the sinuous type having a series of connected reversely disposed loops, said springs each having a central load bearing portion providing an upper surface having upwardly concave shape, a front supporting portion and a rear supporting portion, said rear supporting portion comprising a first loop extending in a plane upwardly and rearwardly from the rear end of said central load bearing portion, a second loop extending in a plane downwardly from the upper end of the first loop, a third loop extending from the lower end of the second loop in an upwardly and rearwardly inclined plane and a fourth loop extending from the upper end of the third loop, said fourth loop being secured to said rear portion of the frame.

2. The combination set forth in claim 1 wherein said fourth loop is disposed in coplanar engagement with a face of the rear portion of the frame.

3. The combination called for in claim 2 wherein said face on said rear portion of the frame inclines upwardly in a rearward direction.

4. The combination called for in claim 3 wherein said fourth loop when untensioned inclines upwardly in a forward direction relative to its disposition when secured to said face of the rear portion of said frame.

5. In a seat construction, the combination comprising a front rail, a rear rail and a plurality of spaced sinuous spring elements, each said spring element comprising a central load bearing portion which is normally arched upwardly, a front supporting portion extending from the front end of said load bearing portion and fastened to said front rail and a rear supporting portion extending from the rear of said load bearing portion, said rear supporting portion comprising a plurality of loops including a first loop having its plane extending upwardly and rearwardly from the rear end of said load bearing portion, a second loop extending downwardly from said first loop and having its plane forming an acute angle with the plane of said first loop, a third loop extending upwardly and rearwardly from said second loop and having its plane forming an acute angle with the plane of said second loop, and a fourth loop extending upwardly from said third loop, and means for mounting said fourth loop on said rear rail against movement downwardly and outwardly relative to said load bearing portion.

6. The combination set forth in claim 5 wherein each of said loops in said rear spring supporting portion comprises parallel transverse bars connected by straight longitudinally extending bars.

7. The combination set forth in claim 5 wherein said rear rail includes a generally vertical surface, said fourth loop of said rear supporting portion of each spring element resting on said surface, and means for anchoring the upper end of said loop to said rear rail.

8. In a seat structure, the combination comprising a front rail, a rear rail and a plurality of spaced sinuous spring elements, each said spring element comprising a plurality of loops having straight transverse bars connected by straight longitudinally extending bars, each said spring element having a central upwardly arched load bearing portion, a front supporting portion extending from the front end of said load bearing portion and fastened to said front rail, and a rear supporting portion extending from the rear end of said load bearing portion, said rear supporting portion comprising a first loop having its plane extending upwardly and rearwardly, a second loop having its plane extending downwardly and rearwardly from the first loop and forming an acute angle with the plane of said first loop, a third loop extending upwardly and rearwardly and having its plane forming an acute angle with the plane of said second loop, and a fourth loop extending upwardly from said third loop, and means for pivoting the upper end of said fourth loop to said rear rail for movement only upwardly and inwardly relative to said load bearing portion.

9. A spring element for a seat comprising a central upwardly arched load bearing portion, a front supporitng portion and a rear supporting portion, said rear supporting portion comprising a first loop having its plane extending upwardly and rearwardly from the rear end of said load bearing portion, a second loop extending downwardly from said first loop and having its plane forming an acute angle with the plane of said first loop, a third loop extending upwardly and rearwardly from said second loop and having its plane forming an acute angle with the plane of said second loop, and a fourth loop extending upwardly from said third loop.

10. The combination set forth in claim 9 wherein said loops of said rear supporting portion comprise parallel transverse bars connected by straight longitudinally extending bars.

11. A spring element for a seat comprising a sinuous load bearing portion, a sinuous front supporting portion and a sinuous rear supporting portion, said rear supporting portion comprising a first loop having its plane extending upwardly and rearwardly from the rear end of said load bearing portion, a second loop extending downwardly from said first loop and having its plane forming an acute angle with the plane of said first loop, a third loop extending upwardly and rearwardly from said second loop and having its plane forming an acute angle with the plane of said second loop, and a fourth loop extending upwardly and forwardly from said third loop and having its plane forming an obtuse angle with the plane of said third loop.

12. In a spring seat, the combination comprising a sinuous spring strip having a load bearing portion, a front supporting portion and a rear supporting portion, said rear supporting portion comprising a plurality of loops comprising parallel transverse bars and straight longitudinal bars and including a first loop bent upwardly and rearwardly from the rear end of the load bearing portion, a second loop bent downwardly from the end of said first loop, a third loop bent upwardly and rearwardly from the end of said second loop, the plane of said third loop being generally parallel to said first loop, and a fourth loop bent from the end of said third loop and extending upwardly at a greater angle to the horizontal than said first and third loops, a rear frame member extending at an angle to the longitudinal axis of the spring strip, the end of said fourth loop being secured to said frame member.

References Cited in the file of this patent

UNITED STATES PATENTS

| | | |
|---|---|---|
| 2,731,075 | Flint | Jan. 17, 1956 |
| 2,830,654 | Neely | Apr. 15, 1958 |
| 2,859,802 | Asaro | Nov. 11, 1958 |
| 2,910,115 | Myers | Oct. 27, 1959 |

FOREIGN PATENTS

| | | |
|---|---|---|
| 733,330 | Great Britain | July 6, 1955 |